Figure 1:
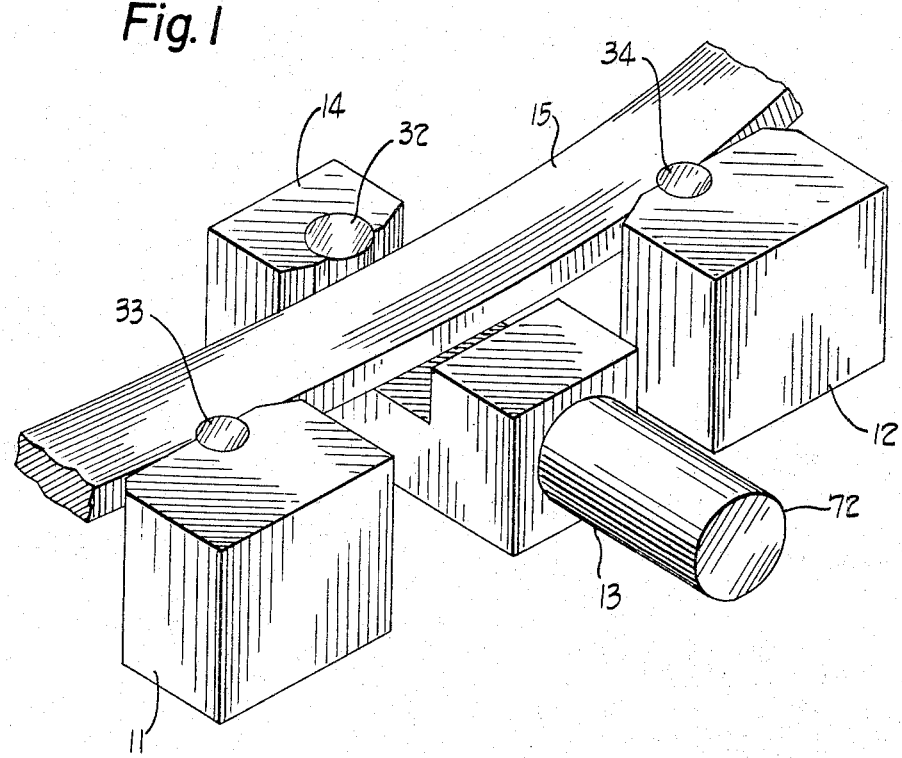

Aug. 1, 1967

H. W. MERGLER ETAL 3,333,445

DIGITALLY CONTROLLED METAL FORMING

Filed June 23, 1964

11 Sheets-Sheet 1

INVENTORS.
HARRY W. MERGLER
BY ERIK TROSTMANN
Schramm, Kramer & Sturges

ATTORNEYS

Aug. 1, 1967 H. W. MERGLER ETAL 3,333,445
DIGITALLY CONTROLLED METAL FORMING
Filed June 23, 1964 11 Sheets-Sheet 5

INVENTORS
HARRY W. MERGLER
ERIK TROSTMANN
BY Schwarz, Kramer & Sturges
ATTORNEYS.

Aug. 1, 1967    H. W. MERGLER ET AL    3,333,445
DIGITALLY CONTROLLED METAL FORMING
Filed June 23, 1964    11 Sheets-Sheet 10
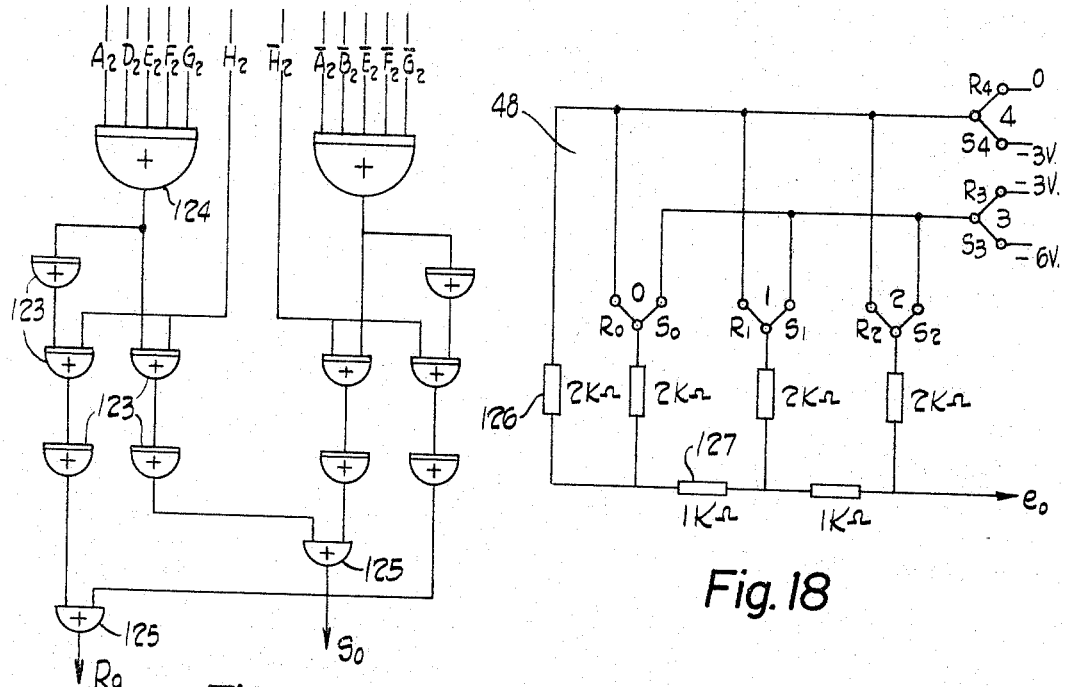
Fig. 17
Fig. 18
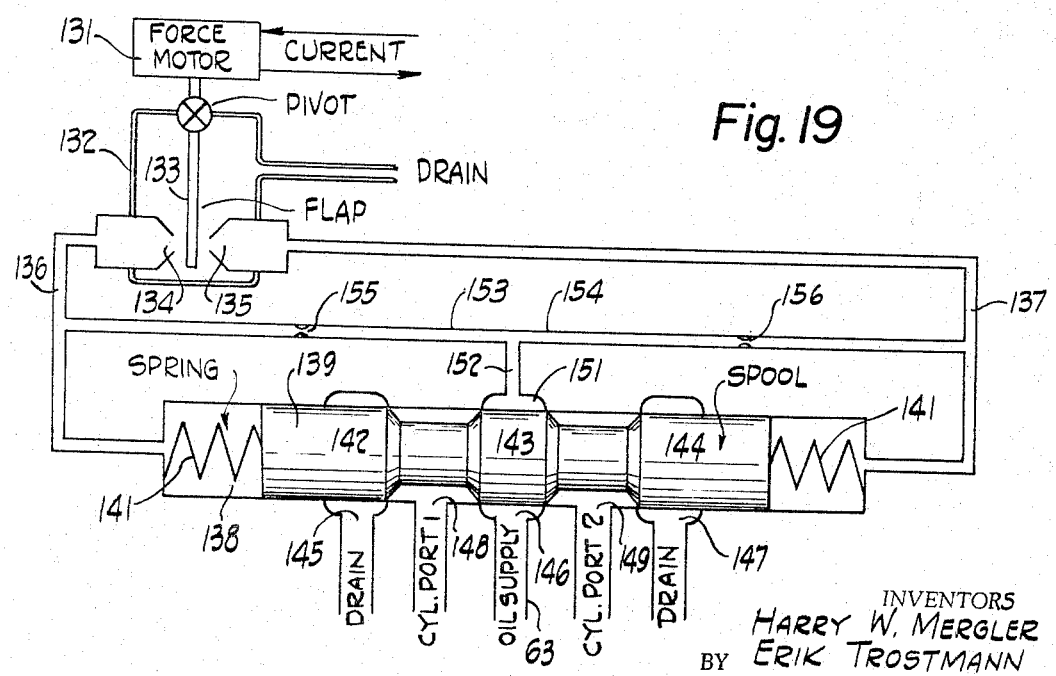
Fig. 19
INVENTORS
HARRY W. MERGLER
BY ERIK TROSTMANN
Schramm, Kramer + Sturges
ATTORNEYS.

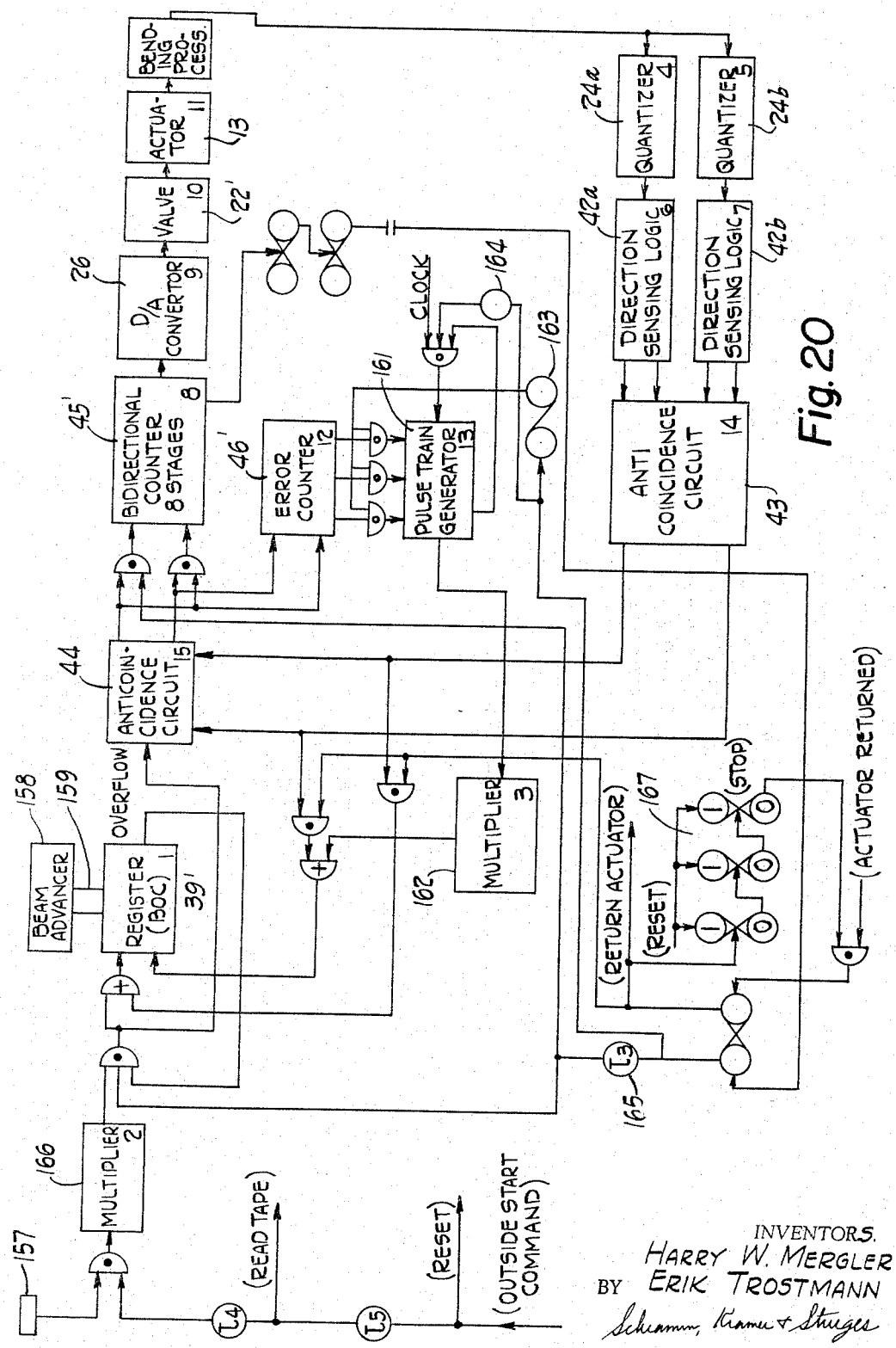

United States Patent Office 3,333,445
Patented Aug. 1, 1967

3,333,445
DIGITALLY CONTROLLED METAL FORMING
Harry W. Mergler and Erik Trostmann, Cleveland, Ohio, assignors to Case Institute of Technology, a corporation of Ohio
Filed June 23, 1964, Ser. No. 377,332
11 Claims. (Cl. 72—9)

This invention relates to metal forming and the control thereof in accordance with a predetermined pattern.

An object of the invention is to achieve a high degree of conformation of curvature of a beam along its length to a desired curvature.

A further object of the invention is to compensate automatically for spring-back in metal shaping.

Another object of the invention is to provide simple, reliable apparatus for measuring beam curvature and to provide apparatus responsive thereto for applying requisite bending force for achieving desired curvature.

A specific object of the invention is to provide improved arrangements for bending ship frames or ribs.

Other and further objects, features and advantages of the invention will become apparent as the description proceeds.

In carrying out the invention in connection with beam shaping in accordance with a preferred form thereof, bending force is applied to the beam successively at successive portions along the length thereof and increments of curvature are measured by measuring increments of angular displacement of the ends of the beam. The desired curvature for successive points along the beam is set into a data system and compared with the readings of angular displacement to control the bending force applied.

For this purpose a pair of abutment posts is provided with a hydraulic ram spaced from the abutment posts sufficiently to permit placing a beam between the ram and the abutment posts in any one of successive longitudinal positions in which curvature is to be applied to the beam. The ram is adapted to be moved against the line joining the abutment posts for bending the beam. Angle sensing means are secured to the beam. There is a register adapted to receive a signal representing the angle to be produced in the beam, and an actuator is provided for the hydraulic ram responsive to the relationship between the signal and the angle sensor for actuating the hydraulic ram.

Preferably incremental quantizers are provided for converting the measurements of the angle sensors into pulses and the register receives the angle of curvature information in digital form so that digital error signals result unless the beam has been brought to the requisite curvature. Such error signals are converted into analog form for actuating the bending mechanism.

Figure 2:
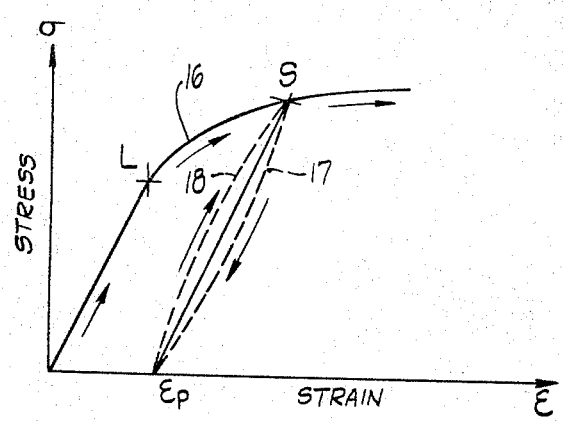
Figure 3A:
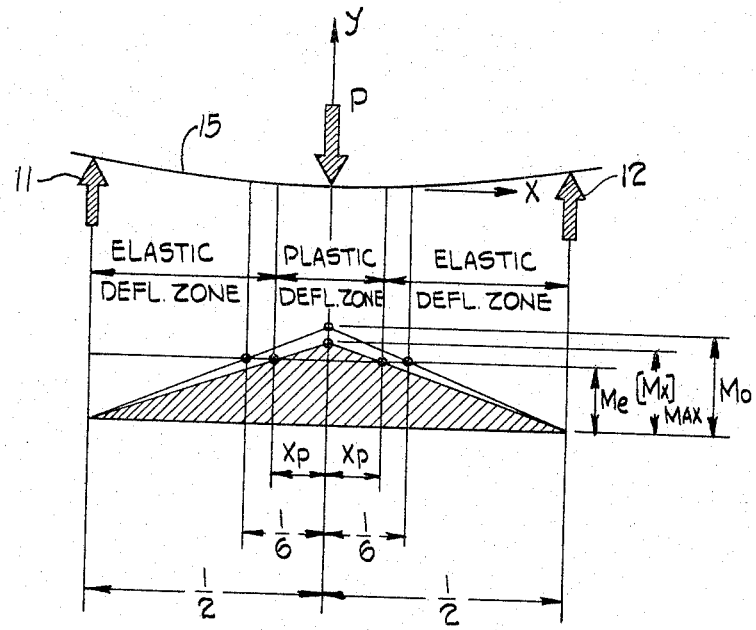
Figure 3B:
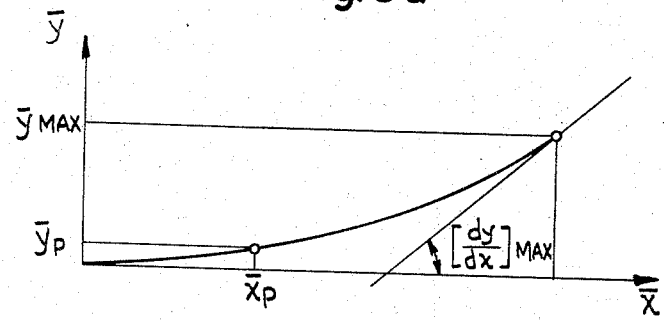
Figure 4:
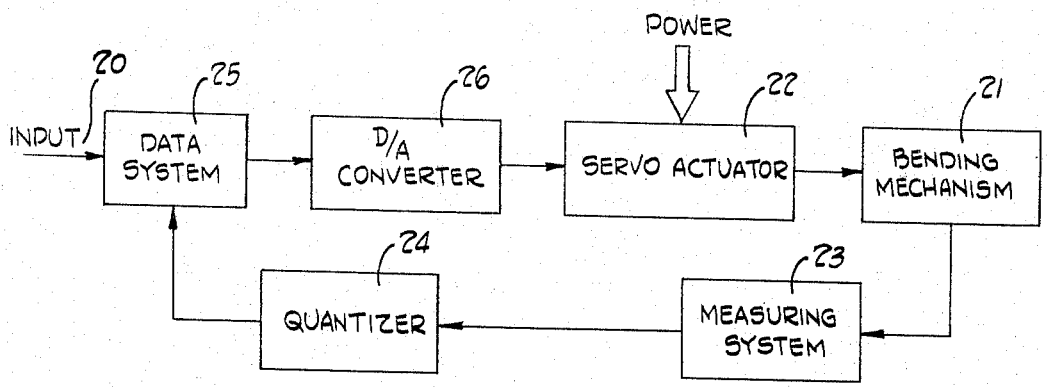
Figure 5:
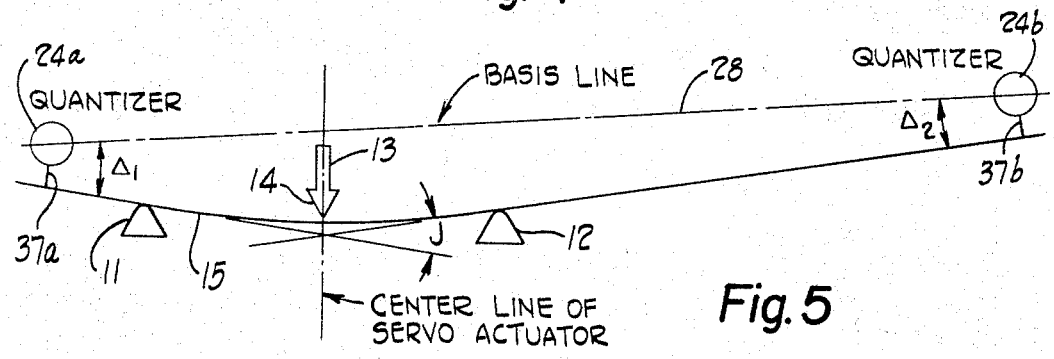
Figure 6:
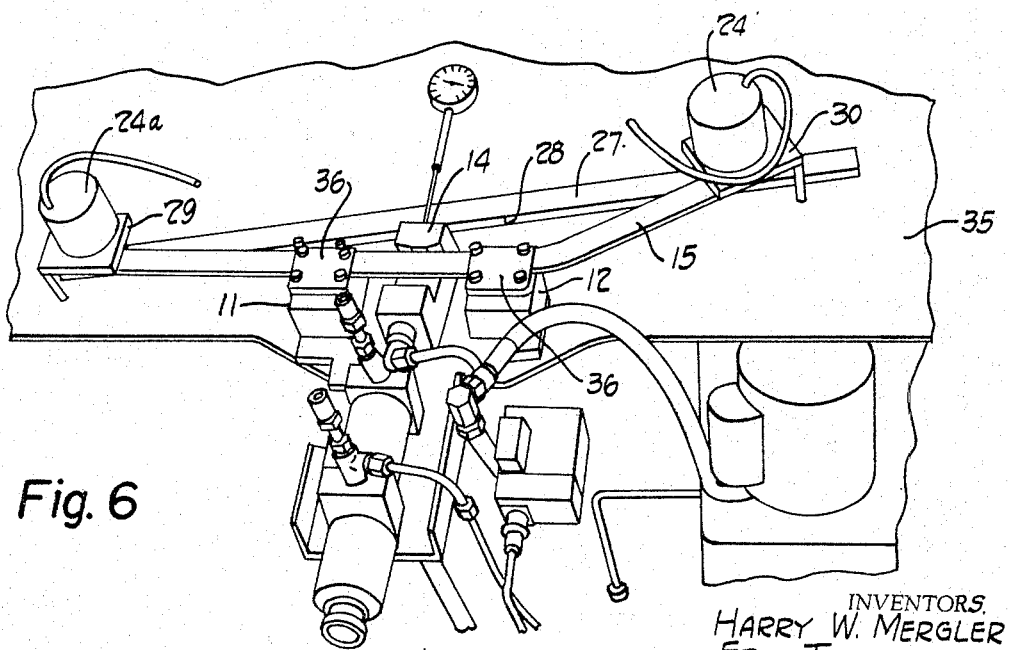
Figure 7:
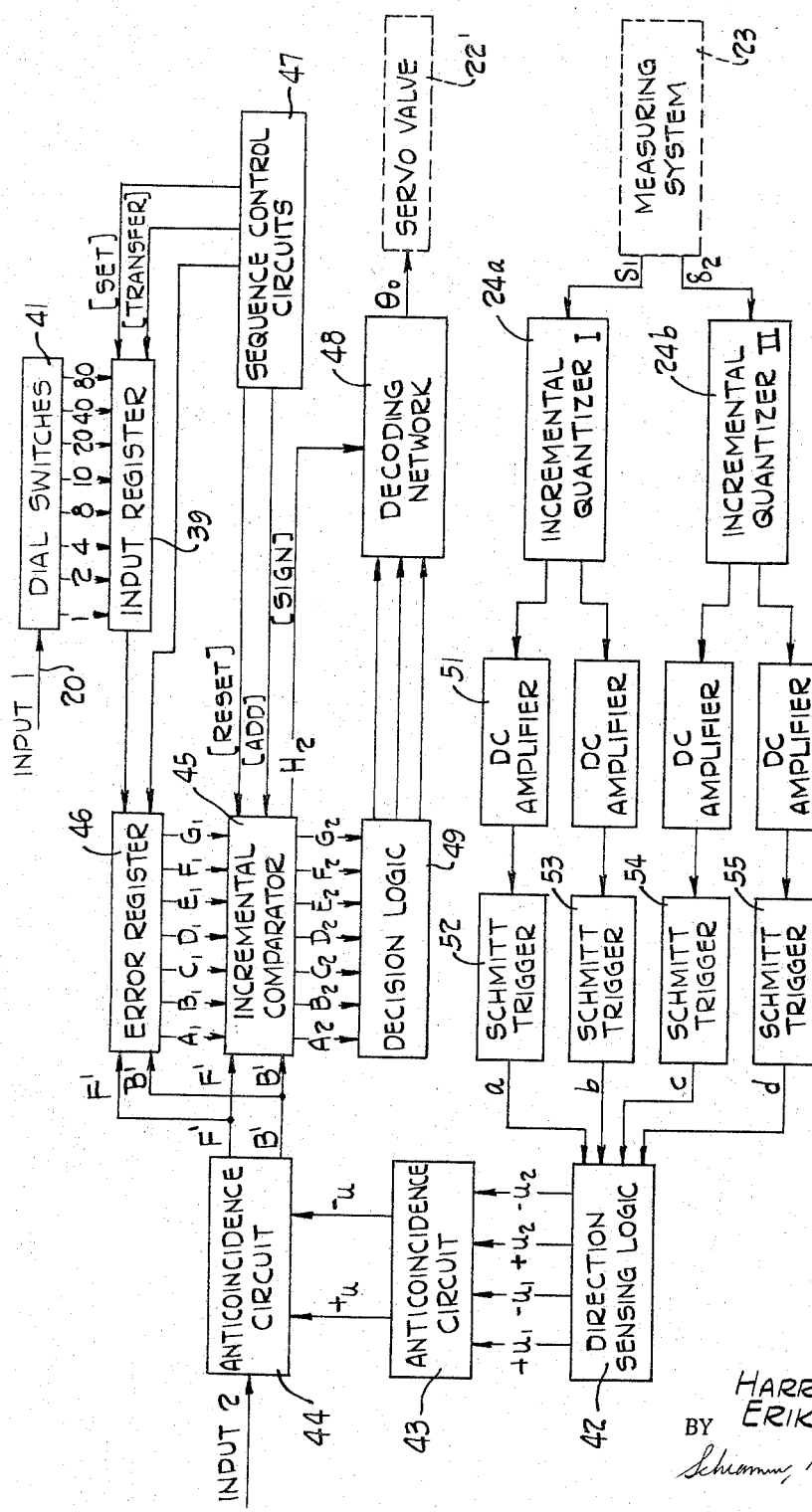
Figure 9:
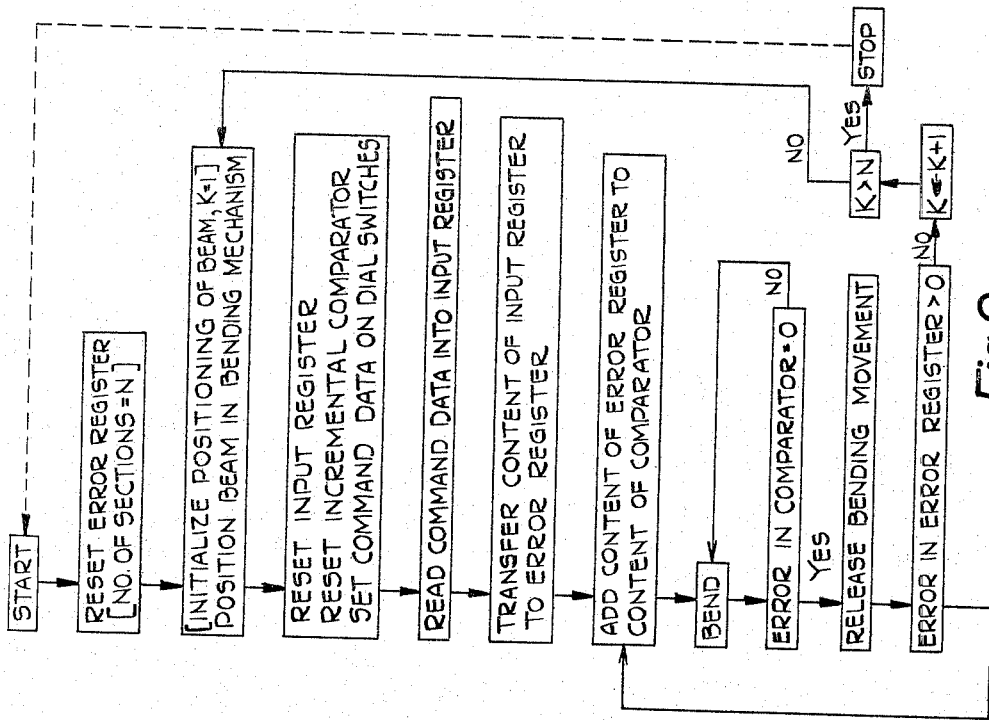
Figure 8:
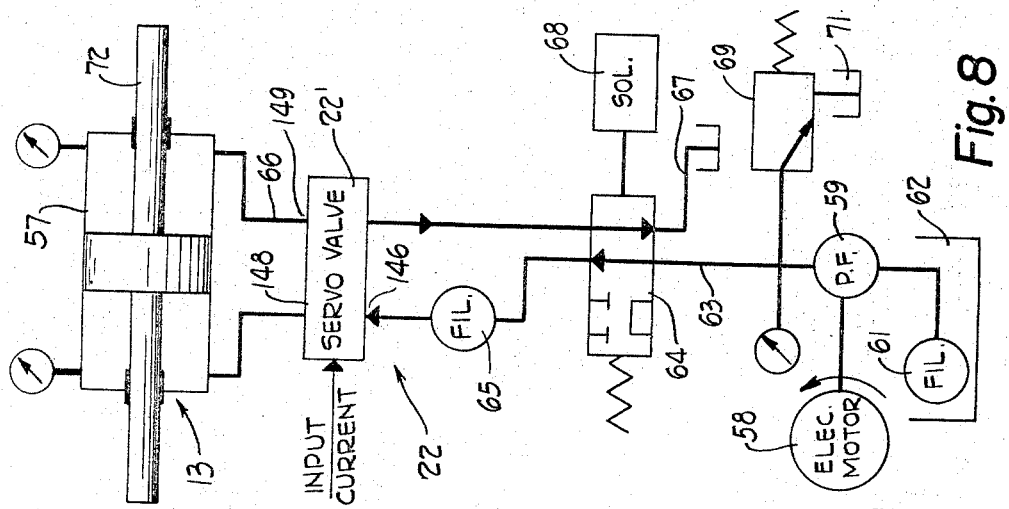
Figure 10:
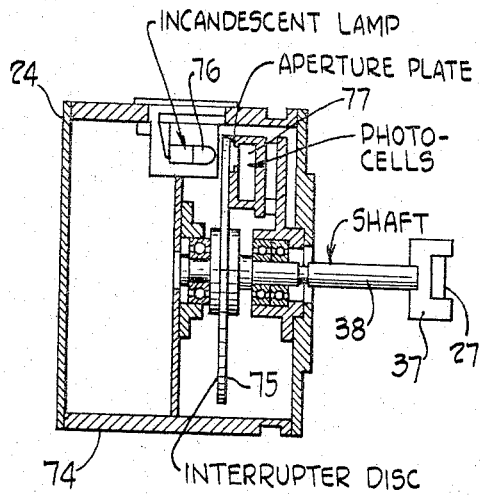
Figure 11:
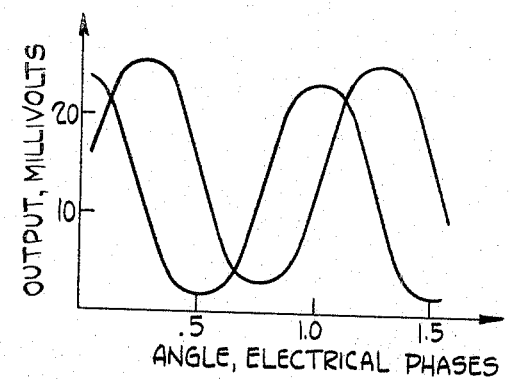
Figure 12:
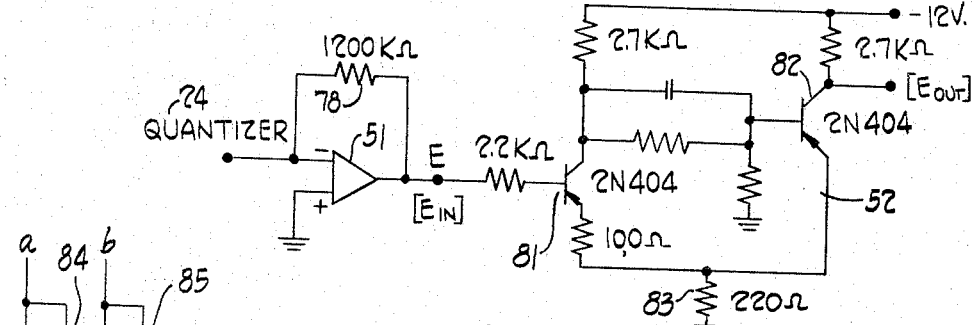
Figure 13:
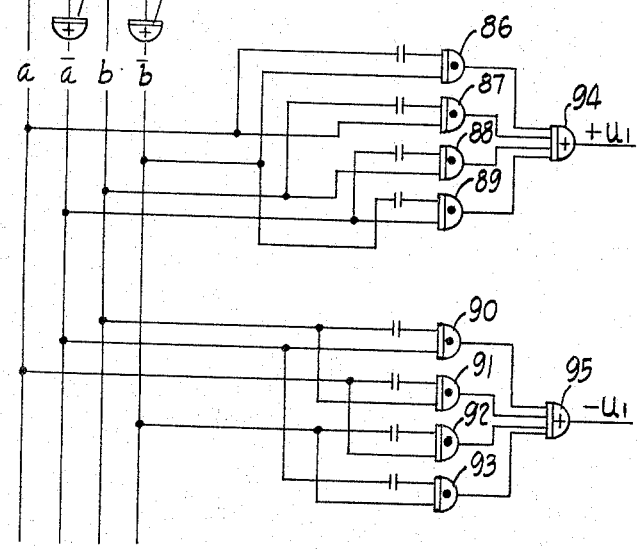
Figure 14:
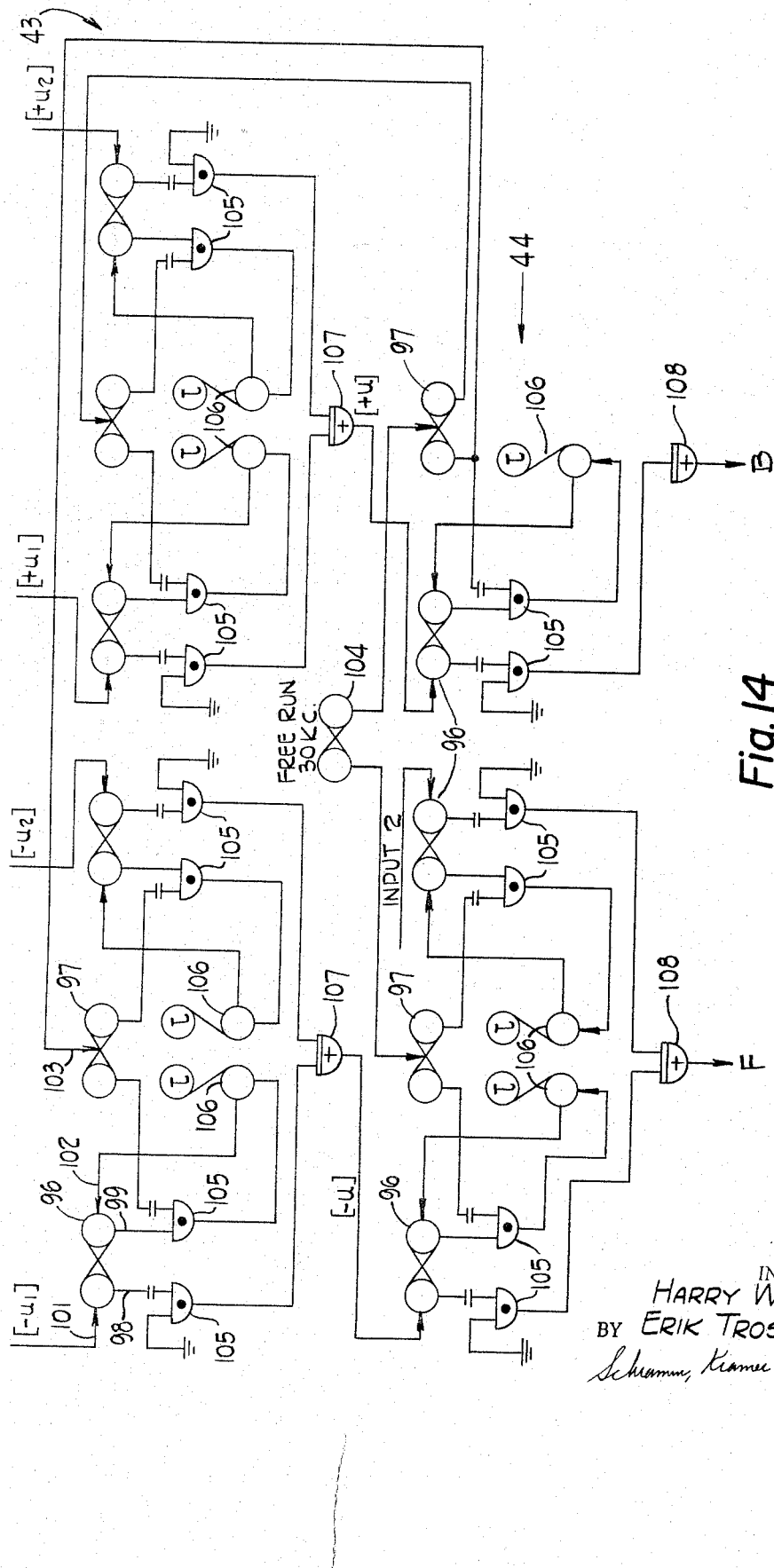
Figure 15:
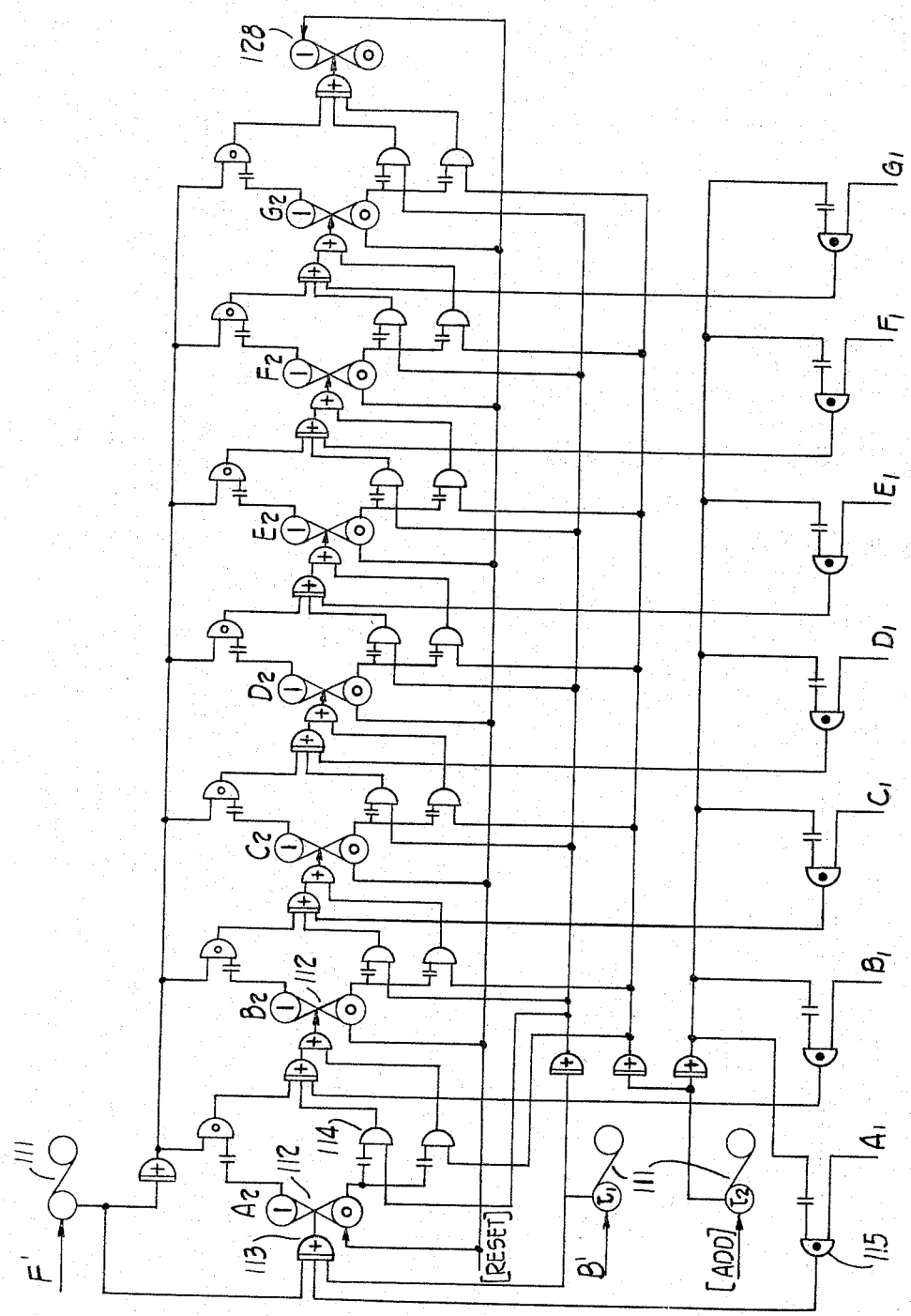
Figure 16:
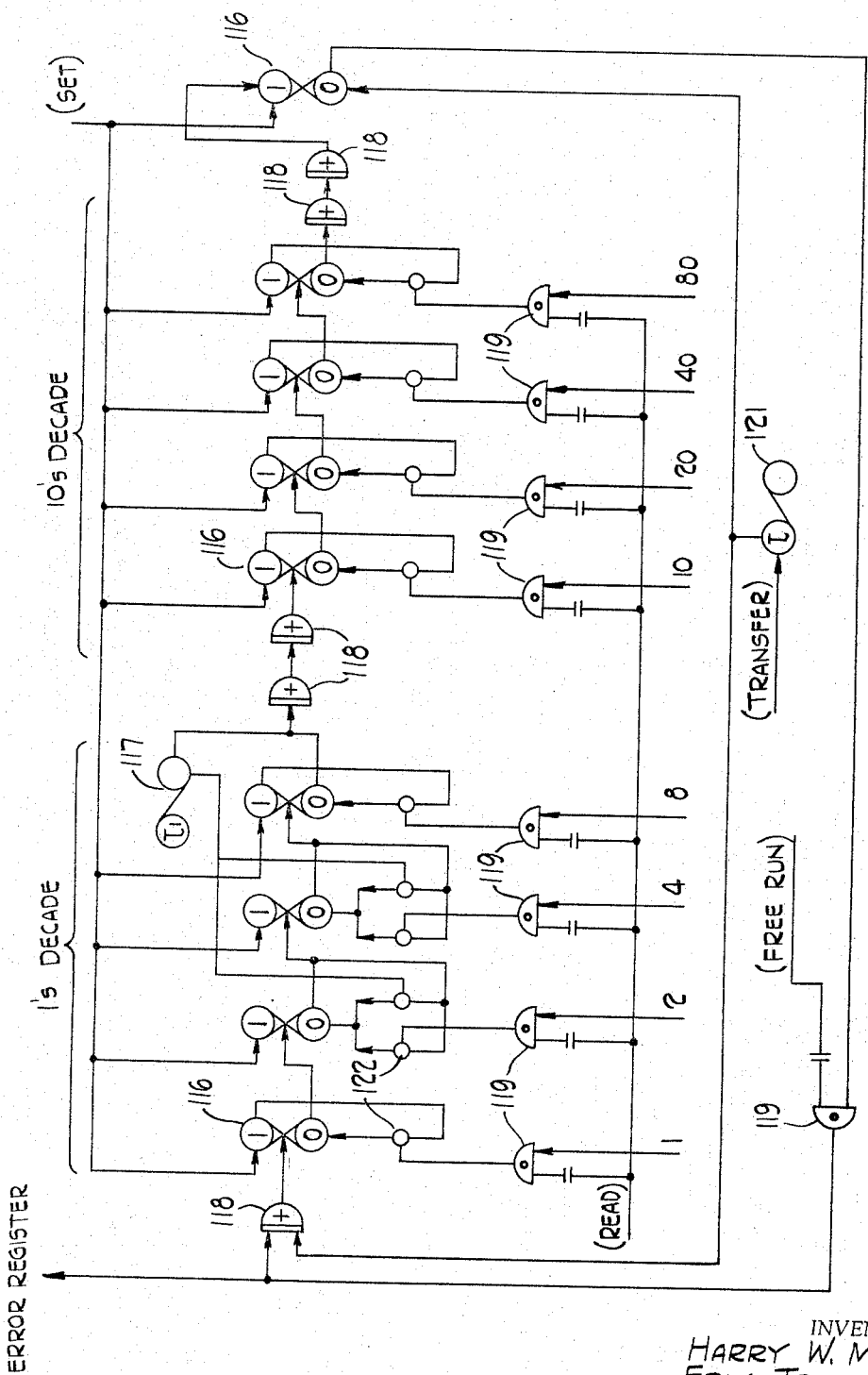

A better understanding of the invention will be afforded by the following detailed description considered in conjunction with the accompanying drawings in which:

FIG. 1 is a fragmentary view in perspective of a portion of the apparatus including the abutment posts and portion of a hydraulic ram acting upon a beam to be bent, FIG. 2 is a graph illustrating a typical elastic recovery from plastic strain in which applied stress is plotted in the vertical direction and strain in the horizontal direction, FIG. 3a is a load situation and moment diagram and FIG. 3b is a reference coordinate system diagram, FIG. 4 is a block diagram of the entire system including the bending mechanism, measuring system and control apparatus, FIG. 5 is a schematic diagram illustrating the principle of operation of the measuring system of FIG. 4, FIG. 6 is a perspective view of the bending mechanism, servo actuator and angle quantizers, FIG. 7 is a block diagram of the data system, FIG. 8 is a schematic diagram of the servo actuator and hydraulic power system, FIG. 9 is a flow chart representing the sequence of events and the operation of the system, FIG. 10 is a view of a cross section of one of the angle increment quantizers, FIG. 11 is a graph illustrating the output of the quantizer of FIG. 10 in which output in millivolts is plotted in a vertical direction and angle is plotted in a horizontal direction, FIG. 12 is a circuit diagram of the amplifier trigger unit, FIG. 13 is a circuit schematic diagram of the direction sensing logic, FIG. 14 is a circuit diagram of the anti-coincidence circuits, FIG. 15 is a circuit diagram of the incremental comparator, FIG. 16 is a circuit diagram of the input register, FIG. 17 is a circuit diagram of the decision logic, FIG. 18 is a circuit diagram of the digital to analog converter, FIG. 19 is a schematic diagram of the servo valve, and FIG. 20 is a block diagram of the control loop for a full scale bending machine which controls the operation of the feeding mechanism and positions the beam in the bending machine between each operation and which controls the bending operation itself.

Like reference characters are utilized throughout to designate like parts.

In the embodiment of the invention illustrated, digital servo mechanism is employed for controlling the generation of plane curved metal beams by plastic bending. The servo mechanism is self-adaptive in the sense that it operates on input command data specifying only the geometric shape of the beams, and it compensates for spring-back and variations in properties of the metal. The beam is formed in cold condition by using relatively large forming forces.

The design of the system is based on a bending mechanism shown in principle in FIG. 1. This mechanism comprises two simple supports or abutment posts or blocks 11 and 12 with a force actuator 13 in the form of a hydraulic ram having a lug 14 at which the bending force attacks a beam 15 to be bent in the middle point between the supports 11 and 12. For simplicity in the drawing the beam 15 is shown as being of rectangular cross section, but it is representative of members of suitable cross-sectional shape such as might be used in ship frames. The distance between the supports 11 and 12 is in general much smaller than the total length of the beam 15, the remainder of which has been broken away for simplicity in FIG. 1. The bending moment is applied to the beam at various points along its longitudinal axis by repositioning the beam in the bending mechanism after each completed bending operation.

Certain metals such as mild steel and aluminum yield under excessive load. This property is made use of in cold forming of metal shapes. In FIG. 2 a typical stress strain curve for mild steel is shown by the curve 16. The curve has two regions—a lower region with constant slope and an upper region with decreasing slope. A stress strain curve for aluminum has no region with constant slope. In the region with constant slope in FIG. 2 the stress and strain are governed by Hooke's law. If, however, the stress anywhere in the metal exceeds that at the point L in FIG. 2 (the proportional limit), the stress strain relationship is more complicated and difficult to formulate in precise mathematical terms. Moreover, the non-linear part of the stress strain curve of FIG. 2 is valid only for increasing stress. If any unloading from a point S above L and in the non-linear region of FIG. 2 takes place, the unloading path will be as indicated by the dotted line 17.

If the unloading is complete, a permanent strain $\epsilon_p$ remains. A reloading will follow a path 18 close to the unloading path as shown. When the point S (where the unloading started) is passed, the path for a first loading case is followed closely. Successive unloading-reloading cycles will describe paths characterized as above. If a certain amount of permanent strain is wanted in the unloaded state, the excessive stress must be applied in order to overcome the decrease in strain due to the elastic recovery during unloading. This elastic recovery is known as spring-back.

In the diagram of FIG. 2 only an infinitesimal fiber of the material has been considered. In terms of finite dimensions such as a beam bent by a bending moment, the permanent deflection and the spring-back for a given load situation are determined not only by the stress strain relationship of the material but also by the geometry of the beam. The apparatus described herein is designed to make allowance for the spring-back regardless of beam geometry and it is unnecessary to compute beforehand the effect of beam geometry upon the amount of spring-back.

In order to compute deflection curves of beams bent into the plastic range, it is necessary to make some assumptions. The case of interest here is a beam simply supported at the end points and bent by a single force applied to the beam at the middle point between the two supports as shown in FIG. 3a. The following assumptions are made:

(1) The material is assumed to be homogeneous and to behave as an elastic, prefectly plastic material.

(2) The stress-strain curves for tension and compression are assumed to be equal.

(3) The cross sections of the beam are assumed to remain plane during and after the deformation.

(4) The bending force and the support forces are assumed to attack the beam at mathematical points, and the deflections which occur are assumed not to change the load.

(5) The effects of shear stresses are neglected.

(6) Changes in the width of the beam are neglected so that a uniaxial strain problem can be assumed. This is equivalent to assuming the material to be incompressible.

A beam with a constant rectangular cross section is considered. The plane of the external forces is assumed to be longitudinal plane of symmetry. With the loading force P acting on the beam (see FIG. 3a), the external bending moment is $$M_x = \frac{P}{2}(l-x)$$

and the maximum bending moment (for $x=l/2$) is:

$$[M_x]_{Max} = \frac{1}{4}P$$

where $l$ is the distance between supports 11 and 12, and $x$ is measured from one support. When $[M_x]_{Max}$ exceeds the maximum elastic bending moment $M_e$, plastic deformations will occur in the beam. The maximum elastic bending moment $M_e$ is two-thirds the maximum bending woment $M_o$ which the cross section can resist. Accordingly, plastic deformations in the beam occur when the ratio of the maximum bending moment (for $x=l/2$) to the maximum bending moment which the cross section can resist, $[M_x]_{Max}$ divided by $M_o$, is less than unity or greater tha two-thirds. This is illustrated in the graph of FIG. 3a. The external bending moment $M_x$ in a given vertical cross section of the beam is balanced by the moment created by the stress as acting in that cross section.

The relationship between the deflection of the beam $y_p$ and the distance along the beam $x$ is represented in the graph of FIG. 3(b). This shows that the maximum slope $[dy/dx]_{Max}$ occurs at the end of the beam.

As illustrated in FIG. 4 and FIG. 5, the beam forming apparatus includes the actual bending mechanism 21 including the abutment posts 11 and 12 and the beam contacting lug 14 of the hydraulic ram 13, a servo actuator 22 for the hydraulic ram 13, an angle measuring system 23 connected to the beam 15, a quantizer 24 for converting the measurement of the angular increments from the measuring system 23 into pulses, a data system 25 for receiving in digital form from input 20 information as to the increment of angular bend of the portion of the beam between the abutment posts 11 and 12 required to produce the desired curvature in this portion of the beam and comparing it with the output of the quantizer 24, and a digital to analog converter 26 for controlling the servo actuator 22 in accordance with the output of the data system 25 by error signals resulting from any discrepancy between the input data and the measured incremental angular bend.

The measuring system 23 includes a rod 27 (FIG. 6) having a straight edge 28 serving as the basis line or reference line with respect to which increments of angular bend of the beam 15 are measured, and a pair of angle sensors 29 and 30 having relatively movable portions connected respectively to the ends of the beam 15 and the ends of the rod 27, which has the straight edge or basis line 28. The quantizer means 24 of FIG. 4 actually comprises two separate quantizers 24a and 24b connected to the angle sensors 29 and 30 respectively.

When a beam is to be bent, the angular measuring system is mounted on the beam and is not removed from the beam until the beam has been bent into the final shape. The beam is then placed in the correct position in the bending mechanism 21 including the abutment posts 11 and 12 and the hydraulic ram 13. The corresponding angular deflection is determined from the program which specifies the wanted shape of the beam. The number representing this is then fed into the data system 25 through a set of dial switches or tape. The data system derives from this input an output which performs a control action on the servo actuator 22. This in turn delivers the necessary power to bend the beam.

When the beam has deflected the specified amount, the bending load is released and the resulting spring-back is now measured by the measuring system 23 and is registered in a digital form by the data system 25. Based upon this information, a new control signal to the servo actuator 22 is derived, and the actuator reloads the beam which is still in the same longitudinal position in the bending mechanism 21; this time the beam is bent an amount as specified by the data system, beyond the wanted deflection. Then the beam is again unloaded. As before, the data system registers a digital representation of the resulting spring-back and on the basis of the total error defined here as a difference between the present angular deflection of the beam and the wanted deflection, the data system derives a new control signal to the servo actuator. By repeating this procedure a few times, the beam will finally assume a permanent angular deflection, that is, the deflection when the bending load is removed, as specified in the program.

In the bending mechanism as illustrated in FIG. 1 and FIG. 6, the load force and the support forces are applied to the beam 15 through dowel pins 32, 33 and 34 mounted in blocks of mild steel forming respectively the abutment lug 14 of the hydraulic ram 13 and the support posts 11 and 12. The diameters of the dowel pins 32, 33 and 34 are determined such that no severe marks are made on the beam during the bending process. The support blocks 11 and 12 and the actuator block 14 are mounted on a rigid table of steel 35 (FIG. 6). The table 35 serves also as a support for the free ends of the beam 15 and the measuring system. In order to prevent any curvature of the beam 15 in a direction normal to the bending plane, clamps 36 are mounted on the support blocks 11 and 12.

The measuring system 23 is so arranged as illustrated in FIG. 5 as to deliver an output representing the change in the angular deflection of the beam during the bending. This change is the sum of the change in the angle $\Delta_1$ and the angle $\Delta_2$. Angle $\Delta_1$ is the angle between the left hand end of the straight edge rod 27 and the left hand end of the beam 15 as measured by the angle sensor 30 and the angle $\Delta_2$ is the corresponding angle measured by the angle sensor 29.

The quantizers 24a and 24b are mounted with housings fixed to the beam which is being bent by connections represented in FIG. 5 schematically by lines 37a and 37b. The quantizers have shafts (not shown) connected to the straight edge rod 27 so that they cannot turn relative to each other. A sliding connection is provided between the quantizer shafts and the straight edge rod 27 so that, although the center distance between the quantizers changes during the bending of the beam 15, relative rotation between the quantizer shafts and the straight edge rod 27 and between each other cannot take place. The connection may take the form of a slotted or channeled member 37 secured to the quantizer shaft 38 and slidable with respect to the straight edge rod 27 but not rotatable with respect thereto, as shown in FIG. 10.

The data system 25 comprises a feed back portion of a closed loop control system operating on the incremental data from the quantizer 24 with the remaining portion of the data system operating on the absolute data from the input 20. Logical units are applied in the system designed as a synchronous logic, which uses differentiated level changes as information carriers.

As illustrated in FIG. 7, the data system 25 comprises an input register 39 with dial switches 41, a direction sensing logic 42 responsive to the incremental quantizers 24a and 24b, a pair of anti-coincidence circuits 43 and 44 receiving the output of the direction sensing logic 42, an incremental comparator 45 and an error register 46 receiving the output of the anti-coincidence circuit 44. Interconnected with the error register 46, the incremental comparator 45 and the input register 39 are sequence control circuits 47. For controlling the servo valve 22′ of the servo actuator 22, a decoding network 48 is provided with a decision logic 49 interposed between the incremental comparator 45 and the decoding network 48.

Direct-current amplifiers 51 are interposed in the pairs of outlets of the incremental quantizers 24a and 24b. Schmitt triggers 52, 53, 54 and 55 are interposed between the outputs of the respective D-C amplifiers and four inputs a, b, c and d to the direction sensing logic 42.

During a bending operation the angular change is measured as the angular displacements of the shafts 38 (FIG. 10) of the two incremental quantizers 24a and 24b. These operate as photoelectric pulse generators which, at their output terminals, deliver electrical pulses when the quantizer casings are rotated relative to the shafts. Each quantizer has two output lines as illustrated in FIG. 7 so that direction sensing can be obtained as will be described more in detail hereinafter. For one increment of shaft displacement, one pulse is delivered on each output line of the quantizer. The pulses appear as low level direct current signals and amplification is necessary.

The amplifiers 51 are solid state operational amplifiers with feed backs.

The shape (but not the amplitude) of the pulses from the type of quantizer illustrated depends upon the speed of the input shaft relative to the casing. In order to convert the information contained in these pulses into pulse data which can be operated on by standard, electronic, digital modules, the wave form of the signals from the quantizers is changed to that of a square wave. This is done by the transistorized Schmitt triggers 52, 53, 54 and 55.

Four square wave outputs of the triggering circuits 52 to 55 are fed into the direction sensing logic 42, which delivers appropriate pulse data on its four output lines. One pulse of proper polarity is produced for each unit change (quantum) of the controlled variable angle. The output lines designated $u_1$ transmit pulse data representing $\delta_1$. If $\delta_1$ is positive, the pulses occur on the $+u_1$ line and if $\delta_1$ is negative, the pulses occur on the $-u_1$ line. An equivalent relation exists between $\delta_2$ and the output lines designated $u_2$.

In the anticoincidence circuits 43 and 44, the various pulse lines are combined to two. One line, B′, transmits pulses corresponding to an increase in the angle being measured and the other line, F′, transmits pulses corresponding to a decrease in the angle being measured, the line designated input 2 is used for external command data when the circuit is tested.

Both the incremental comparator 45 and the error register 46 can operate as bidirectional binary counters; and pulses on the lines F′ and B′ make these counters count forward and backward respectively. Command data from the error register are also fed into the comparator. These command data are either transmitted into the data system through the input to the input register or they are derived from the measured spring-back of the beam.

In the comparator 45, a digital comparison is made between the value of the algebraic time integral of the command data and the algebraic time integral of the data generated by the feed back path, that is, the response data. The magnitude of the difference between these integrals is an absolute binary quantity representing the error in the control loop. The comparator 45 as shown in FIG. 15 contains 7 binary stages an a sign stage.

In the decoding network 48, the digital error taken with the proper sign is converted to an analog error signal which is appropriate for controlling the servo actuator. The decoding network 48 is designed as a voltage decoder with ladder network. The decision logic 49 serves to limit the velocity of the output member of the servo actuator.

When the system starts a bending operation at a certain longitudinal section of the beam, the command data are set on the dial switches 41. These switches accept decimal from the line 20 and deliver the command data in binary coded decimal form (8, 4, 2, 1-code) on the output lines.

From the dial switches 41, the command data are read into the initially cleared input register 39. This register operates as a backward counter and counts in the 8, 4, 2, 1-code. By counting the input register down and counting the error register up, the command data are transferred to the error register 46. After the transfer, the command data are stored in the error register 46 in standard binary coded form.

In order to start the first bending operation, the command data from the error register are transferred to the reset incremental comparator 45. This transfer takes place with the input of the servo valve 22′ disconnected. In order to perform the transfer of the data, the error register and the incremental comparator operate as a parallel adder. When the control loop is closed, the beam 15 is deflected until the error in the comparator 45 is approximately 0. Then the control loop is again disconnected and the actuator load on the beam is removed.

When the beam is completely unloaded, the spring-back that occurred is represented by the state of the error register 46 and of the incremental comparator 45. Now, after adding the content of the error register 46 to the content of the comparator 45, a second bending operation is performed and the beam is again unloaded. If necessary, a third addition is made and a third bending operation is carried out followed by a third unloading of the beam. By continuing this iteration until the content of the error counter reads 0 or -1, the wanted permanent deflection of one longitudinal section of the beam has been obtained and the beam is positioned to a new position in the bending device.

The iteration process is based upon the two following facts:

(1) The content of the error register represents at any time the absolute error in the control system.

(2) The slope of the curve representing the bending force P as a function of the deflection data, is positive but decreasing when data increases. Therefore, errors due to over-bending are not likely to occur.

It is important to note that the error in angular deflection at each longitudinal section of the beam after each bending process is stored in the error register. By carrying the error over to the bending process of the adjacent section, a buildup in the total error due to angular errors in each stop of the bending process is prevented.

The sequence control circuits 47 are arranged to control the sequence of the control actions, the information flow and the data derivation. The sequence control may be initiated either manually or automatically.

The servo actuator 22 comprises the electrohydraulic servo valve 22' and a hydraulic cylinder 57, which delivers the power necessary for the bending process.

The servo valve 22' is arranged to deliver a hydraulic output flow proportional to the input current from the decoding network 48. The hydraulic input to the servo valve 22' is provided by a polarized electrical force motor 58 driving a single fixed displacement pump 59 which receives a suitable fluid such as oil through a filter 61 from a reservoir 62 delivering it through a line 63, a normally open valve 64 and a filter 65 to the servo valve 22'. Fluid from the opposite end of the hydraulic cylinder 57 is exhausted through a line 66, the servo valve 22' and the normaly open valve 64 to a sump 67. There is a solenoid 68 for closing the valve 64 when the operation is completed. There is also a maximum pressure relief valve 69 with a sump 71. The valve 64 is a flapper nozzle valve, which acts as a pilot valve for the servo valve 22'. The latter is a closed-center, four-way sliding spool valve. Output flow from this valve is proportional to the spool displacement.

The hydraulic cylinder 57 is double acting and the piston rod 72 is double ended. This design provides symmetrical oil volumes under pressure and enables the piston rod 72 to carry load forces perpendicular to the longitudinal axis of the rod.

The sequence of operations which the system executes is summarized in the flow chart of FIG. 9. N represents the number of longitudinal sections of the bent beam 15 and K is a running index.

Manual positioning of the beam 15 in the pilot bending system is illustrated and described in connection with FIGS. 1 and 7 but it will be understood that the invention does not exclude controlling the positioning by an automatic feeding mechanism. Dial switches have been described by way of illustration for feeding input command data into the pilot system. Preferably, however, in order to avoid losses due to setting errors of the dial switches, a tape reader system is used. Likewise, although manual sequencing of the operations of the bending systems has been described, the invention does not exclude the provision of automatic control circuits for this purpose.

The data system 25 includes logical units, digital to analog, and analog to digital converters. The standard commercial modules and components may be used in constructing the major portion of the system although some special circuitry has been employed.

The logical modules shown by way of illustration in the drawings are those manufactured by Wang Laboratories Inc., Massachusetts under the designation Series 200 Logibloc Transistorized Module Building Blocks. These include flip-flops, NOR circuits, one-shot multivibrators, free running multivibrators, gated pulse generators and drivers. These logical modules are designed for an operation frequency up to 200 kc.

The logical circuitry used in this design is classified as asynchronous and the following definitions are used:

An $\alpha$-transition equals a 0 to 1 transition.

A $\beta$-transition equals a 1 to 0 transition.

The following symbolic definitions are used for the purpose of this explanation only:

"+" equals the logical connective OR.

"." equals the logical connective AND.

The quantizer 24 as shown in FIG. 10 may take the form of a Gurley photoelectric pulse generator, Model 8603. This quantizer is a shaft-driven device delivering electrical pulses on two output terminals. The number of pulses delivered is directly proportional to the angular displacement of the shaft.

The quantizer comprises a light-tight housing 74 containing a glass disc 75 carrying a precise circular pattern of alternately clear and opaque sectors. The disc 75 is mounted on the shaft 38. A fixed source of light 76 is provided on one side of the disc and two photo-voltaic photocells 77 are placed on the other side of the disc. As the disc rotates, light is periodically permitted to fall on the photocells 77.

The photocells 77 are positioned 90° out of phase electrically and deliver a series of direct-current pulses as the shaft is rotated. If the shaft is rotated with constant speed, the outputs are approximately sinusoidal as shown in FIG. 11. The two signals from the photocells are used for direction sensing. The sequence of signal A before signal B, or signal B before signal A, will indicate the direction of rotation.

The disc pattern contains 2500 dark lines, but by reading both the rise and the fall of the signals A and B in the direction sensing logic, the resolution is increased to 10,000 pulses per revolution.

The outputs of the quantizers 24 are low level direct-current signals which require amplification. Continuous reading of the photocells in the quantizers is preferred; therefore, one amplifier 51 is required for each reading channel as shown in FIG. 7. Any suitable amplifier such as a commercial transistor amplifier Philbrick, Model P65 may be employed. The amplifier employed should have high drift stability. Eventual drift must be low because it will not only cause direct error in the output of the control system, but the proper phase relationship between the quantizer output signals may also be lost and thus sacrifice the direction sensing. The amplifiers are stabilized and proper voltage gain is obtained by external feedback resistors.

In order to obtain precise square wave output independent of voltage fluctuations, the Schmitt triggers 52 to 55 are connected to the outputs of the amplifiers 51. The Schmitt trigger circuit is shown in FIG. 12.

The Schmitt trigger 52 comprises two stages of transistors 81 and 82 with a common emitter resistor 83 providing feedback so that the circuit is regenerative and capable of assuming two stable states determined by the input voltage. If the input voltage is below the lower triggering level, the output voltage will assume a low level approximately $-12$ volts. If the input voltage is above the upper triggering level, the output voltage will assume a high level, approximately 0 volts. It is important to keep the difference between the two triggering levels very small. This difference introduces a dead zone effect.

The specific details of the design of the Schmitt trigger circuit are not a part of the present invention but are described in greater detail in the article by J. Corsiglia "A Transistorized Schmitt Trigger" in the Electrical Design News for June 1961.

The circuits of the direction sensing logic 42 are shown in FIG. 13 for the outputs of Schmitt triggers 52 and 53. The circuit comprises two NOR gates 84 and 85, gated pulse generators 86 to 93 inclusive and NOR gates 94 and 95 with interconnecting lines interposed between input terminals $a$ and $b$ and output terminals $+u_1$ and $-u_1$ leading to the anticoincidence circuit 43.

The anticoincidence circuits 43 and 44 are provided to prevent racing conditions on the input lines of the incremental comparator 45 and the error register 46. Racing conditions might lead to loss of information. The circuits are shown in FIG. 14. There are flip-flops 96 and 97 with reset outputs 98 and set outputs 99. The flip-flops 96 have reset inputs 101 and set inputs 102 and the flip-flops 97 have trigger inputs 103. There is a free running multivibrator 104 for controlling the operation of the circuits. Gated pulse generators 105 are provided as well as one shot, monostable multivibrators 106, OR gates 107 and NOR gates 108.

The anticoincidence circuits 43 and 44 insure proper separation in time between pulses on the output lines F and B. The circuit will accept a pulse repetition rate on the input lines not greater than 7500 pulses per second. This rate allows a minimum time interval of 8 to 9 microseconds between the pulses on the output lines.

The counter is constructed of T-flip-flops and a steering signal (F' or B') is provided to indicate forward or backward counting.

The comparator is shown in FIG. 15. It comprises one shots or monostable multivibrators 111, flip-flops 112, NOR gates 113, OR gates 114 and AND gates or gated pulse generators 115.

The comparator 45 has two modes of operation: (1) it operates as a bidirectional counter, and (2) it operates as a parallel adder. The comparator is either in the one mode or the other.

The bidirectional counting is performed in standard binary code. The counter consists of seven binary stages and one sign stage, and therefore it can take on 256 different stages.

A positive error in the control loop is represented in its true binary form and with a sign bit equal to one. A negative error is represented by the 1's complement plus 1 and the sign bit is equal to 0. In this manner, 0 error is represented by only one state in the counter, namely 000000001, whereas the least significant position is to the left and the sign bit to the right.

As shown the counter comprises T-flip-flops and a steering signal F' or B' is provided to indicate forward or backward counting.

The time $\tau_1$ that the two one shots 111 in the input lines are in their unstable state must allow for a carry propagation from the least significant stage into the sign stage. $\tau_1$ must be smaller than the minimum time interval between a forward and a backward pulse.

When the comparator operates as a parallel adder, the augend ($A_2 B_2$ * * * $G_2$) is stored in the flip-flops. When the add signal appears, the bits of the addend ($A_1 B_1$ * * * $G_1$) are added in parallel form to the bits of the augend. The sum digits replace the augend digits. The carry propagation is asynchronous.

In order to allow a carry propagation from least significant position to most significant position, a steering signal of a duration of 60 microseconds and a separate set of propagations gates is provided.

The error register 46 is a bidirectional counter, and its construction is similar to the counter portion of the incremental comparator 45. When data are transmitted serially into the error register 46 from the input register 39, the control operation of the feedback system is discontinued.

The input register 39 is essentially a backward coded decimal (8, 4, 2, 1-code) counter. It consists of counting stages for two decades as shown in FIG. 16 and control circuitry. There are flip-flops 116, a one shot 117 between the one's decade and the ten's decade, NOR gates 118, AND gates or gated pulse generators 119, a transfer one shot or monostable multivibrator 121 and steering gates 122. When a read pulse appears from the sequence control 47, the decimal number preset in the dial switches 41 is read into the register 39 in binary coded decimal form.

When a transfer pulse is received, the register 39 acts as a pulse train generator, which allows a number of pulses equal to the original decimal number to appear on the input line to the error register 46. The input register 39 and the error register 46 perform a code to code conversion.

In order to limit the velocity of the servo actuator 22 during the control action without sacrificing the static accuracy of the system, a decision logic 49 is provided between the incremental comparator 45 and the decoding network 48. In the arrangement illustrated the maximum amplitude of the analog error is let correspond to a digital error of 8.

The circuit of the decision logic 49 is shown in FIG. 17. It comprises NOR gates 123 and 124 and OR gates 125. The total decision logic 49 comprises two or more stages of circuitry equivalent to the circuitry illustrated in FIG. 17.

The decision logic 49 controls the switches 0, 1 and 2 of the decoding network 48 which constitutes a digital to analog converter. As illustrated in FIG. 18, the network 48 is arranged to convert the digital error to an equivalent analog voltage. It operates as a voltage source ladder network. When $S_0$ is true, switch 1 is in position $S_0$, and so forth. Commercially available units similar to the digital modules may be used as the elements of the decoding network 48, circuits of which are shown schematically in FIG. 18 illustrating the principle of operation.

The magnitude of the number represented by the state of the comparator 45 controls, through the decision logic 49, the transistor switches 0, 1 and 2. The switches connect or disconnect the voltage supply to the ladder network composed of the 2000 ohm resistors 126 and the 1000 ohm resistors 127. The sign flip-flop 128 in the comparator (FIG. 15) controls the transistor switches 3 and 4 of FIG. 18. If the sign is positive, the switches are in positions $S_3$ and $S_4$ respectively.

The output voltage $e_0$ of the circuit can be expressed as (the plus [+] sign stands for addition):

$$e_0 = \frac{V}{2^3}(S_0 2^0 + S_1 2^1 + S_2 2^2)$$

The load impedance is here assumed infinite and $e_0$ is measured from 0 volts when the sign is negative and from $-3$ volts when the sign is positive. The supply voltage V is $-3$ volts. Preferably to avoid loading effects, the decoding network 48 shown in FIG. 18 is arranged to drive an emitter-follower, the output of which is the actuating signal to the servo valve 22'.

The mechanical construction of the servo valve 22' is shown schematically in FIG. 19. There is a force motor 131 actuated by the current output $\beta_0$ of the decoding network 48 actuating a flap valve 132 having a pivoted flap 133 controlling orifices 134 and 135 of tubes 136 and 137, respectively, connected to opposite ends of a cylindrical chamber 138 containing a spool 139 biased to the center position in the chamber 138 by springs 141.

The spool 139 has lands 142, 143 and 144 cooperating respectively with ports 145, 146 and 147 when the spool 139 is in the neutral position. Between the oil supply port 146 and the drain ports there are ports 148 and 149 for the opposite ends of the hydraulic cylinder 57 (FIG. 8). The supply port 146 is thus closed to the other ports when the spool 139 is in the neutral or center position. When the spool is deflected in either direction, one cylinder port is connected to the oil supply 63 and the other to a drain port.

The chamber 138 is formed with an enlargement 151 at the oil supply port 146 for connecting the oil supply line 63 to a line 152 joining lines 153 and 154 connected to the tubes 136 and 137 and containing constrictions 155 and 156 respectively.

The arrangement is such that the position of the flap 133 is determined by the magnitude of the current flowing in the force motor 131 which in turn determines the relative resistance opposed to the flow of oil at the flap orifices 134 and 135. In this manner the relative pressure applied to the ends of the spool 139 is determined in order to determine the position of the spool 139 in the chamber 138. The position of the spool 139 in turn determines the relative pressure of oil applied to the ports 148 and 149 and the opposite ends of the hydraulic cylinder 57 in order to determine the position of the piston rod 72 and the angle of bend applied to the beam 15.

A simplified block diagram of the control loop which controls the bending operation is shown in FIG. 20 in a modified system in which coded command data is stored in punched paper tape of conventional type instead of the dial switches 41 of FIG. 7.

Preceding each bending operation, the command data stored in punched paper tape 159 is read by a tape reader into registers 139', 166 and 162 at positions 1, 2 and 3. All digits in one line on the tape 159 are read parallel into the memories.

The register 139' in position No. 1 controls the proper number of pulses representing the wanted angle change $\delta\theta$ entered into the control loop which controls the bending process.

The pulses are generated by a free running pulse generator or multivibrator (a clock) 157 and the rate of the pulses which enter the system is determined by the preset of the register in the binary operational multiplier 166 position 2.

Mechanism 158 is provided for advancing the beam which includes mechanism synchronized with beam advancing rolls for advancing tape 159 containing the command data for the bending operation. The arrangement is such that at the conclusion of each bending operation the same signal which shuts down the bending operation advances the tape 159 and the beam advancer 158 so that the next bending step of the beam is in accord with the bending command data for that portion of the beam.

The feedback loop controlling the bending process operates in the following manner:

The quantizers 24a and 24b at positions 4 and 5 acting as analog to digital converters generate the feedback signal previously discussed. The transducers act as incremental pulse generators. The quantizers or pulse generators are each associated with a set of direction sensing logic 42a and 42b at positions 6 and 7. The sum of the outputs of the two direction sensing logics 42a and 42b represents the change of the controlled variable (the angle $\delta\theta$) with proper polarity, each pulse representing a unit change (a quantum) of $\delta\theta$.

In the bidirectional binary counter 45' at position 8, acting as an incremental digital comparator, is the binary value of the time integral of the feedback signal subtracted from the binary value of the time integral of the input data fed into the counter from the register 39' at position 1. The input data is a train of pulses, each pulse representing a wanted unit change of the angle $\delta\theta$. The number of pulses represents the total wanted change $\delta\theta$ in the step in question. The rate at which the input pulses enter the counter represents the wanted velocity in the bending process.

The state of the bidirectional counter 45' represents at any time the error in the control loop in binary digital form.

In the digital to analog converter 26 at position 9 the digital error is translated to an appropriate analog signal, which is first amplified and then used to activate the torque motor in the one stage electrohydraulic servo valve 22' at position 10.

The servo valve 22' controls the position of the hydraulic cylinder unit actuator 13 at position 11.

Theoretically, the number in the bidirectional counter 45' will be 0 when there is no error. In a physical system, however, this state of the counter is difficult to obtain as a steady state. In the system illustrated, therefore, the error is defined to be 0 when the counter has passed the 0 state a preset number of times.

When the error becomes 0, a signal initiates the return of the actuator 13 and shifts the connection of the feedback path from the bidirectional counter 45' at position 8 to the bidirectional counter and register 39' at position 1, which is an 8, 4, 2, 1 scaler.

When the actuator 13 at position 11 has return, the signal reads the content of the error counter 46' at position 12 into the register of a pulse train generator 161 at position 13. The error counter 46' is always connected to the quantizers 24a and 24b and to the input of the loop. The content of the error counter therefore represents the present absolute angular error.

The pulse train generator 161 generates a number of pulses equal to two times the absolute error and the number of pulses are multiplied by a factor $f$ in the multiplier 162 at position 3. The factor $f$ is a number between 0 and 2 and is determined by experience concerning the amount of spring-back.

From the multiplier 162 at position 3, the pulse train is fed into the register 39' at position 1.

One shots or monopulse multivibrators 163, 164 and 165 are provided to act as time delays to determine the sequence of events.

Preceding each bending operation, a multiplier 166 at position 2 and the multiplier 162 at position 3, the register 39' at position 1 and a counter 167 at position 16 are reset by the beam advancing mechanism 158. The counter 167 determines the number of times a single operation is repeated.

The error counter 46' at position 12 is reset only each time that a new beam is to be bent.

While the invention has been described as embodied in concrete form and as operating in a specific manner in accordance with the provisions of the patent statutes, it should be understood that the invention is not limited thereto since various modifications will suggest themselves to those skilled in the art without departing from the spirit of the invention.

What is claimed is:

1. A method for automatically adjusting a metal bending device to compensate for spring-back of a beam occuring after bending the beam out of a fixed plane, parallel to the longitudinal axis of the beam comprising the steps of:
   (a) recording a pulsating signal reflecting the required angular deflection to place a predetermined bend in a beam;
   (b) measuring the actual angular deflection of the beam after bending and spring-back of the beam;
   (c) translating the measured actual angular deflection into a pulsating signal;
   (d) comparing the translated actual pulsating signal with the recorded pulsating signal for predetermined differences in the signals; and
   (e) utilizing a predetermined difference in the signals to activate the beam bending device for further bending the beam such that the actual beam deflection after rebending substantially equals the required beam deflection.

2. A method for automatically bending a beam out of a plane parallel to the longitudinal axis of the beam comprising the steps of:
   (a) pre-recording a pulsating signal reflecting the required angular deflection to place a predetermined bend in a beam;
   (b) mounting a beam for bending between a pair of spaced supports lying in a plane parallel to the longitudinal axis of the beam;
   (c) transversely moving a ram against the beam intermediate the supports to deflect and permanently distort the beam out of the plane of the supports;
   (d) measuring the actual angular deflection of the beam after the ram is disengaged from the beam and the beam resiliently springs-back an angular increment;

(e) translating said actual angular measurement into a pulsating signal;

(f) comparing the translated and pre-recorded signals for a predetermined difference therebetween;

(g) utilizing a predetermined difference between said signals for activating the ram to further engage and bend the beam such that the actual angular deflection after rebending and spring-back, is substantially equal to the required beam deflection.

3. Apparatus for bending beams to predetermined shape comprising in combination a bending mechanism, a measuring system responsive to angular deflection of a beam being bent, a quantizer for converting angular indications into pulses, a data system for receiving information in digital form representing the required angular bend of the beam and comparing such information with the quantizer pulses to produce error signals, a digital to analog converted for converting the error signals into analog signals and a servo actuator responsive to such analog error signals to actuate the bending mechanism to bring the bend angle of the beam into conformity with the information received in the data system.

4. A device for bending a beam, comprising in combination:

(a) means for recording a pulsating signal reflecting the angular deflection of a beam required to place a predetermined bend in the beam;

(b) a pair of spaced supports for engaging and holding a beam, the supports lying in a plane substantially parallel to the longitudinal axis of the beam;

(c) a ram intermediate the supports for transversely engaging a beam engaged by the supports, the ram angularly deflecting the beam out of the plane of the supports;

(d) a quantizer adjacent each support, coacting with a beam being deflected by the ram, for measuring angular deflection of the beam after the ram is disengaged from the beam and the beam springs-back an angular increment, said quantizer translating said angular measurement into a pulsating signal for comparison with the recorded pulsating signal; and (e) means responsive to a predetermined difference in said signals for reactivating the ram to re-engage an initially bent beam to further bend the beam such that the resulting actual beam deflection substantially equals the required beam deflection.

5. In a beam bender, in combination a pair of quantizers each having a relatively stationary casing carrying a relatively rotatable movement with a projecting shaft, the casings having means for securing them to separate points along the length of a beam to be bent, a straight edge and means for slidably securing each projecting shaft of the quantizer movement to the straight edge whereby the difference in the relative positions of stationary and rotatable elements of the two quantizers represents the total bend of the beam.

6. A data system for a digitally controlled beam bender comprising in combination an input register with means for setting in the register a value representing desired angle of bend of a beam, an angle measuring system, a pair of incremental quantizers responsive to angular positions of two different points along the length of a beam being bent, a direction sensing logic responsive to the incremental quantizers, anticoincidence circuit means, an incremental comparator responsive to the anticoincidence circuit means, an error register for recording deviations between actual beam bend and the desired beam bend set into the input register, said incremental comparator being responsive to said anticoincidence circuit means and said error register, a decoding network responsive to the signal set into the incremental comparator bending mechanism, and a servo valve responsive to said decoding network for actuating the beam bender.

7. Apparatus as in claim 6 wherein Schmitt triggers are interposed between the incremental quantizers and the direction sensing logic.

8. A beam bender comprising in combination beam supporting means, means for advancing the beam longitudinally in the beam supporting means, measuring means responsive to distance along the beam and responsive to angular bend of the beam, means for recording angular bend with respect to distance along the beam to produce a predetermined shape of the beam in the form of a digital signal, said recording means constituting a register, angle measuring means responsive to the angular deviation between two different portions of the beam, quantizer means for converting the angular measurement into pulses, means for producing pulses corresponding to the signal set in the register, an error counter for comparing such pulses with the pulse output of the quantizers, and a beam bender responsive to said error counter for actuating the bending mechanism until a pulse count of the quantizers corresponds to the pulse count set in the register.

9. Metal forming apparatus comprising in combination work holding means, means for applying force to the work to produce a strain therein, strain measuring means, a data system with means for receiving information as to the desired strain, an error register comparing measured strain with the information in the data system as to desired strain, means responsive to the error register to actuate the force applying means, means for accumulating in the error register discrepancies between the measured strain and the information in the data system and means for reactuating the force applying means until the information in the error register falls substantially to 0.

10. Metal forming apparatus comprising in combination work holding means, means for applying force to the work to produce a strain therein, strain measuring means, a data system with means for receiving information as to the desired strain, an error register comparing measured strain with the information in the data system as to desired strain, and means responsive to the error register to actuate the force applying means.

11. In metal forming apparatus a data system including an input register for receiving information as to desired strain to be produced in work being formed, means for measuring increments of the strain produced in work being formed, means for successively applying forming force to the work, means for comparing the measuring strain with the information set in the input register, and an error register with means for accumulating discrepancies between the information in the input register and the measured strain.

References Cited

UNITED STATES PATENTS

| | | | |
|---|---|---|---|
| 3,075,568 | 1/1963 | Bright | 72—11 |
| 3,145,756 | 8/1964 | Hill | 72—7 |
| 3,188,860 | 6/1965 | Roberts | 73—100 |

CHARLES W. LANHAM, *Primary Examiner.*

R. D. GREFE, *Assistant Examiner.*